(12) United States Patent
Falk

(10) Patent No.: US 12,261,311 B2
(45) Date of Patent: Mar. 25, 2025

(54) ENERGY SUPPLY SUB-SYSTEM FOR AN ENERGY SUPPLY SYSTEM, ENERGY SUPPLY SYSTEM, AND METHOD FOR PROVIDING SAME

(71) Applicant: SMA Solar Technology AG, Niestetal (DE)

(72) Inventor: Andreas Falk, Kassel (DE)

(73) Assignee: SMA Solar Technology AG, Niestetal (DE)

(*) Notice: Subject to any disclaimer, the term of this patent is extended or adjusted under 35 U.S.C. 154(b) by 783 days.

(21) Appl. No.: 17/388,226

(22) Filed: Jul. 29, 2021

(65) Prior Publication Data

US 2021/0359367 A1    Nov. 18, 2021

Related U.S. Application Data

(63) Continuation of application No. PCT/EP2020/052346, filed on Jan. 30, 2020.

(30) Foreign Application Priority Data

Feb. 4, 2019 (DE) ..................... 10 2019 102 639.3

(51) Int. Cl.
*H01M 50/209* (2021.01)
*H01M 10/613* (2014.01)
(Continued)

(52) U.S. Cl.
CPC ....... *H01M 50/209* (2021.01); *H01M 10/613* (2015.04); *H01M 10/663* (2015.04); *H01M 50/204* (2021.01)

(58) Field of Classification Search
CPC ............. H01M 50/209; H01M 10/613; H01M 10/663; H01M 50/256; H01M 10/425
See application file for complete search history.

(56) References Cited

U.S. PATENT DOCUMENTS 5,450,280 A    9/1995  Wactor
10,439,372 B2  10/2019 Chen et al.
(Continued)

FOREIGN PATENT DOCUMENTS

CN    108649595 A    10/2018
EP    2634835 A1    9/2013
(Continued)

OTHER PUBLICATIONS

International Search Report dated Apr. 16, 2020 in connection with PCT/EP2020/052346.

*Primary Examiner* — Adam A Arciero
(74) *Attorney, Agent, or Firm* — Eschweiler & Potashnik, LLC

(57) ABSTRACT

A container for an energy supply system includes a first section configured to accommodate an air-conditioning unit and/or a control circuit during transport of the container and operation of the energy supply system, and a second section configured to accommodate an energy conversion unit during transport of the container. The energy conversion unit is configured to be selectively removed from the container, and the second section includes a fixing structure for shelf units, such that, after the energy conversion unit has been removed from the container, the shelf units are configured to be installed on the fixing structure and can be fitted with storage modules.

15 Claims, 2 Drawing Sheets

(51) Int. Cl.
*H01M 10/663* (2014.01)
*H01M 50/204* (2021.01)

(56) References Cited

U.S. PATENT DOCUMENTS

| | | |
|---|---|---|
| 2014/0097797 A1 | 4/2014 | Hendrix |
| 2015/0280489 A1 | 10/2015 | Curlett |
| 2015/0303418 A1 | 10/2015 | Tanaka |
| 2017/0244225 A1 | 8/2017 | Chen |
| 2017/0288184 A1 | 10/2017 | Schnakofsky et al. |
| 2017/0346322 A1 | 11/2017 | Kuran |

FOREIGN PATENT DOCUMENTS

| | | |
|---|---|---|
| JP | 2012009311 A | 1/2012 |
| JP | 2016189317 A | 11/2016 |
| JP | 2017153341 A | 8/2017 |
| WO | 2014103038 A1 | 7/2014 |
| WO | 2017173246 A1 | 10/2017 |

ENERGY SUPPLY SUB-SYSTEM FOR AN ENERGY SUPPLY SYSTEM, ENERGY SUPPLY SYSTEM, AND METHOD FOR PROVIDING SAME

CROSS REFERENCE TO RELATED APPLICATIONS

This application is a continuation of International Patent Application number PCT/EP2020/052346, filed on Jan. 30, 2020, which claims priority to German Patent Application number 10 2019 102 639.3, filed on Feb. 4, 2019, and is hereby incorporated by reference in its entirety.

FIELD

The disclosure relates to a container for an energy supply system, to an energy supply system having a container according to the disclosure and to a method for providing such an energy supply system.

BACKGROUND

Energy supply systems are used, for example, to support an energy supply grid, for example a public energy supply grid, wherein the energy store of the energy supply system is then connected to the energy supply grid via an energy conversion unit. The energy conversion unit comprises a bidirectionally operable DC/AC converter and a transformer and, in the event of an oversupply of electrical power in the energy supply grid, in the case of which a frequency of the AC voltage in the energy supply grid is typically above a nominal frequency, can generate a power flow into the energy store and can charge the latter. In a similar manner, in the event of an undersupply of electrical power, in the case of which the frequency of the AC voltage in the energy supply grid is typically below the nominal frequency, the energy conversion unit can generate a power flow from the energy store into the energy supply grid and can discharge the energy store.

Such energy supply systems are often also operated for the purpose of supplying large consumers far away from a public energy supply grid. Such consumers are, for example, drilling and conveying systems of a mine. In each of the cases mentioned, the energy supply system may also comprise further energy sources in addition to the energy store, for example a PV generator and/or a wind turbine.

The document US 2017 0346322 A1 discloses a modular electrical energy storage and supply system having one or more transportable containers in order to move the system from one location to another location. As components, the system comprises storage modules for storing electrical energy, an energy conversion unit, monitoring and control units. The components are arranged in a spatially separated manner inside the one or more transportable containers, are uniformly distributed there and are securely enclosed. A system and method for quickly providing energy stores in grid-connected, off-grid, backup or other applications are also presented.

In the known method, the containers are electrically connected to one another via interfaces, while the components, in particular the storage modules, the energy conversion unit and the monitoring and control units, remain in the respective containers during transport and during operation of the energy supply system. However, in the case of an energy supply system having a larger energy store and therefore a large number of storage modules, transport can be carried out only with difficulty on account of the mass. Furthermore, on account of the associated high energy density, a large number of storage modules in a container is a considerable risk for transport. This is the case, in particular, when the container is intended to be shipped in a manner stacked with other containers.

SUMMARY

The disclosure is directed to a container for an energy supply system, which container is easy to transport and can be used to provide the energy supply system in a particularly simple and cost-effective manner. The disclosure is also directed to a method for providing an energy supply system and an energy supply system having such a container.

A container according to the disclosure for an energy supply system comprises:
  a first section for accommodating an air-conditioning unit and/or a control unit during transport of the container and operation of the energy supply system, and
  a second section for accommodating an energy conversion unit during transport of the container, wherein the energy conversion unit is configured to be removable from the container. The second section has a fixing means or fixing structure for shelf units, such that, after the energy conversion unit has been removed, the shelf units can be installed on the fixing means or fixing structure and can be fitted with storage modules in order to start up the energy supply system.

In this case, the air-conditioning unit may be configured to cool the container interior, to monitor the moisture in the container interior and/or to discharge harmful gases from the container interior. Such harmful gases may be produced in the container, for example, during operation of the energy supply system and in one embodiment are discharged. The air-conditioning unit may, but need not necessarily, be arranged completely in the first section. Rather, it is sufficient if one part of the air-conditioning unit is arranged in the first section of the container and another part is arranged outside the container. In particular, in one embodiment it is possible for the air-conditioning unit to penetrate a container wall, advantageously a container wall on the end face. The control unit may be configured for energy store management functions. Such functions are, for example, monitoring the state of charge of the storage modules, protecting the storage modules from overcharging or a deep discharge. Alternatively or additionally, the control unit may also perform functionalities of a superordinate controller for the energy supply system. The energy conversion unit may have a DC/AC converter and/or a DC/DC converter. The energy conversion unit may, in one embodiment, be configured for bidirectional operation and may comprise a bidirectionally operable DC/AC converter and/or DC/DC converter. It may additionally comprise a transformer. In one embodiment the sections can be separated from one another by at least one partition wall, which prevents slipping of components arranged in the individual sections during transport of the container, for example. However, the partition walls need not necessarily be present or, if they are present, may be detachable, such that they can be removed from the container if necessary.

The disclosure uses the effect that, in the case of an energy store having a high number of storage modules, the storage modules are transported separately and outside the container. In one embodiment the storage modules are installed in the container at an operating location of the energy supply system only before the energy supply system is started up.

The container therefore has a considerable amount of free space, at least during transport to the operating location. This free space is used to transport further components of the energy supply system, in particular the energy conversion unit, in the container to the operating location. At the operating location, the energy conversion unit is removed from the container and is set up separately from the latter. Shelf units which are transported to the operating location separately or in the container and are intended to accommodate the storage modules are assembled from their components, if necessary, and are installed on the inner wall of the container using the fixing means or fixing structure. The shelf units are then fitted with the storage modules. Finally, the storage modules are electrically connected both to one another and to the energy conversion unit. The container therefore performs two functions. During transport to the operating location of the energy supply system, it is used as transport means for the energy conversion unit. In one embodiment the actual function of the container is used only at the operating location, namely that of accommodating and air-conditioning the storage modules during operation of the energy supply system. The energy supply system, for example, its energy conversion unit, can therefore be transported in a particularly simple and cost-effective manner. Specifically, the energy conversion unit is transported inside the container which is delivered anyway to the operating location of the energy supply system. In one embodiment separate transport costs for transporting the energy conversion unit, which would otherwise be necessary, do not arise or arise only in a considerably reduced form. Advantageous embodiments of the disclosure are stated in the following description and in the subclaims, the features of which can be used individually and in any desired combination with one another.

In one advantageous embodiment of the container, the second section is divided into a first subregion and a second subregion. In this case, the energy conversion unit is arranged in the second subregion of the second section during transport of the container, while further components of the energy supply system which are needed at the operating location of the energy conversion system, for example, components of the shelf units for the storage modules, are arranged in the first subregion. In this case, the shelf units may be present in the first subregion in a disassembled state or broken down into their components in a space-saving manner. The first subregion may be separated from the second subregion via a partition wall. In this case, the first section, which accommodates the air-conditioning unit and/or the control unit, may adjoin a first end face of the container. A fuse and/or a circuit breaker for operating the energy supply system may also be arranged in the first section. Furthermore, a fire detection unit and optionally an extinguishing apparatus for fighting fires, which may be prescribed in areas with energy storage units, may be installed in the first section. The first section may also have connections for connecting lines from the energy store comprising the storage modules to the energy conversion unit.

The second section, in particular its second subregion, which accommodates the energy conversion unit during transport, may adjoin a second end face of the container opposite the first end face. In this case, the second end face adjoining the second section or a roof side of the container advantageously has a hinged or detachable wall region, through which the energy conversion unit can be removed. In this case, it is also possible for the wall region of the roof side to comprise the entire roof side and/or for the wall region of the second end face to comprise the entire second end face. In this case, the energy conversion unit can be removed in a very simple manner since longer transfer of the energy conversion unit inside the container is avoided. Rather, the energy conversion unit is already arranged directly in an exit region of the container. In one preferred embodiment, the second section has bearings for the guided removal of the energy conversion unit. A rail system with hydraulically acting lifting forks movably mounted thereon may have such a bearing, for example. The guided removal avoids damage both to the energy conversion unit and to the container. The removal may likewise be carried out by one person, possibly two persons, manually or semi-automatically in a manner assisted by the lifting forks.

In one embodiment, the container has fixing elements which are arranged in the second section and are configured to fix the energy conversion unit in an interior of the container, in particular in the second section of the container. If the second section has two separated subregions, wherein the energy conversion system is arranged in the second subregion, the fixing elements are also arranged in the second subregion. In one embodiment the energy conversion unit can be fixed in the second section using the fixing elements during transport of the container and can be arranged there such that it cannot slip. Therefore, a relative movement of the energy conversion unit and of the container, and associated damage to the energy conversion unit and/or the container, during transport is reliably avoided. Appropriate fixing elements may also be provided for further components of the energy supply system which are transported to the operating location of the energy supply system in the container and could otherwise slip during transport and could thereby be damaged themselves and/or could damage other components.

In one embodiment, the container has dimensions which comply with the specifications for standard containers. In particular, the dimensions of the container may correspond to the dimensions of a 20', 20' HC, 40', 40' HC, 45' HC, 45' PW or a 53' HC ISO sea freight container. Since loading areas of conventionally used transport means such as rail, trucks and cargo ships are matched to these dimensions, the container can be transported by these transport means, possibly also in conjunction with other containers, in a particularly simple and reliable manner. Standardized container corners are advantageously fitted at lower—possibly also at upper—corners of the container. These are used as additional fixing aids for the container during transport and, in particular, when a plurality of containers are stacked on top of one another.

In one embodiment of the container, the fixing means or fixing structure for installing the shelf units are arranged along opposite side walls, for example, on their sides facing an interior of the container. In this case, they may be arranged in the second section. In one embodiment, during operation of the energy supply system, the storage modules of the energy store are specifically likewise arranged in the second section of the container, whereas the control unit and/or the air-conditioning unit is/are arranged in the first section both during transport of the container and during operation of the energy supply system. In one embodiment, the container may already have during its transport prelaid electrical lines for connecting the storage modules to one another, for connecting the storage modules to the control unit and/or for connecting the storage modules to the energy conversion unit. In this manner, time-consuming work when laying cables can already be carried out by a supplier of the energy supply system and need not be carried out at the operating location of the energy supply system. Rather, after the container and the storage modules have been delivered, the energy supply system can thus also be quickly started up at the operating location.

An energy supply system according to the disclosure comprises an energy conversion unit, shelf units for accommodating storage modules, storage modules for storing electrical energy and an air-conditioning unit. The energy supply system also comprises a container according to the disclosure. In this case, during its transport, the container according to the disclosure is used as transport means for parts of the energy supply system, in particular its energy conversion unit, but also its air-conditioning unit and/or its control unit.

A method according to the disclosure is aimed at providing an energy supply system which comprises a container with a first section and a second section, an energy store and an energy conversion unit. The energy store comprises a multiplicity of storage modules which are arranged in a plurality of shelf units in the second section of the container during operation of the energy supply system. The energy conversion unit is configured to be accommodated in the second section of the container for the purpose of transporting the energy supply system and to be arranged outside the container for the purpose of operating the energy supply system. In this case, the method comprises:

removing the energy conversion unit from the second section of the container at the operating location of the energy supply system, arranging and installing the shelf units in the second section of the container, fitting the shelf units with the storage modules, and electrically connecting the storage modules to one another, on the one hand, and to the energy conversion unit, on the other hand. The advantages already mentioned in connection with the container according to the disclosure arise both for the energy supply system according to the disclosure and for the method according to the disclosure.

In one embodiment of the method, the energy conversion unit may be removed from the container on the end face or roof side at the operating location of the energy supply system. In this case, the energy conversion unit may be removed from the container in a guided manner by means of a rail system, thus largely avoiding damage to the container and to the energy conversion unit. The energy conversion unit can be transferred to an operating platform, directly or after it has been removed from the container, by means of the rail system. During operation of the energy supply system, the operating platform may be arranged beside the container. The storage modules, with which the shelf units are fitted in the container, may comprise rechargeable batteries. These may be, for example, Li ion, lead and/or NiMH rechargeable batteries.

BRIEF DESCRIPTION OF THE FIGURES

The disclosure is described below with the aid of figures, in which.

DETAILED DESCRIPTION

The disclosure relates to a container for an energy supply system, to an energy supply system having a container according to the disclosure and to a method for providing such an energy supply system. Specifically, the energy supply system in this case comprises an energy store and an energy conversion unit. In this case, the energy store has a multiplicity of storage modules which are arranged in the container during operation of the energy supply system.

Figure 1:
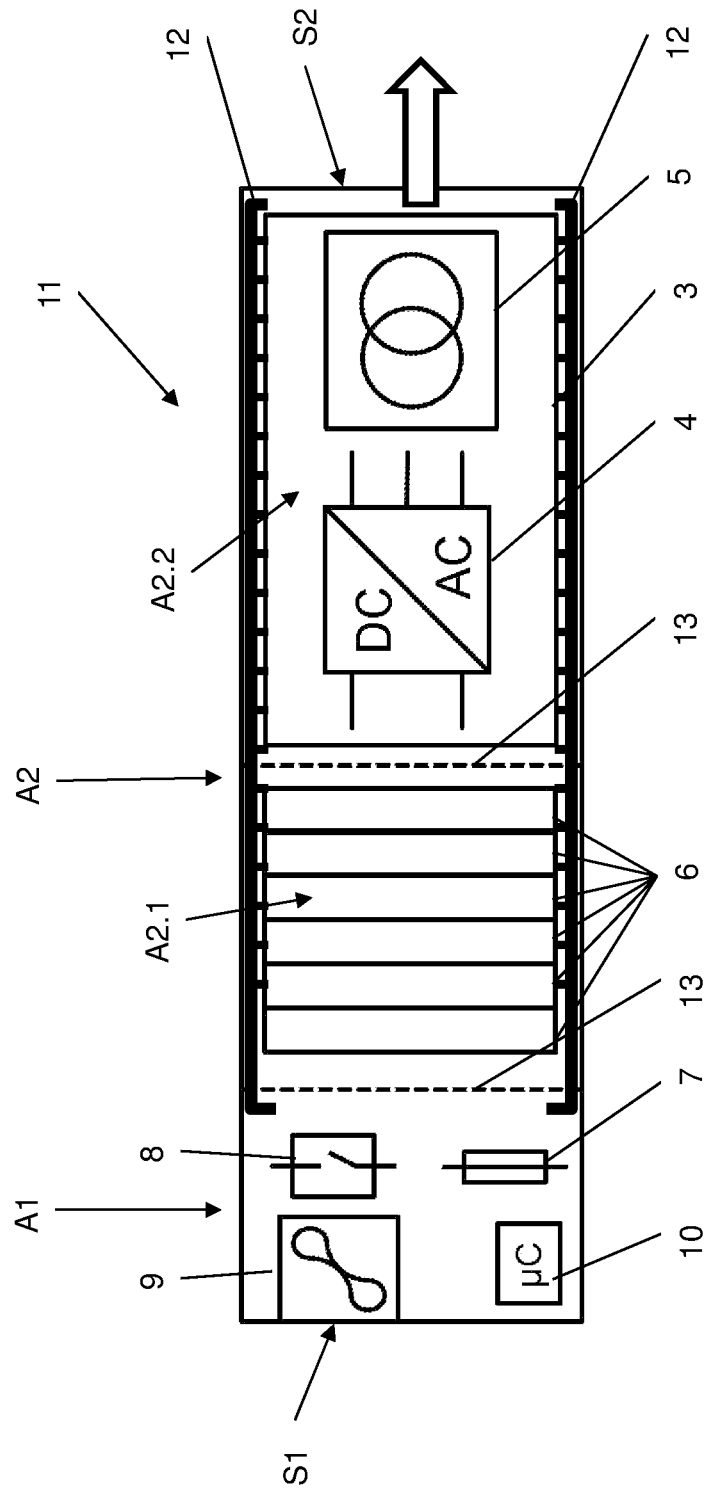
FIG. 1 shows a container according to the disclosure of an energy supply system in a state for transport to an operating location of the energy supply system in a first embodiment.

FIG. 1 illustrates a container 11 according to the disclosure of an energy supply system 1 in a state for transport to an operating location of the energy supply system 1 in a first embodiment. The container 11 comprises a first section A1 and a second section A2. The first section A1 adjoins a first end face S1 of the container 11, while the second section A2 adjoins a second end face S2 of the container. The second section A2 is subdivided into a first subregion A2.1 and a second subregion A2.2 by means of a partition wall 13. An air-conditioning unit 9 and a control unit or circuit 10 are arranged in the first section A1. The air-conditioning unit 9 is completely in the container 11, by way of example, in FIG. 1. However, it is also possible for the air-conditioning unit 9 to penetrate the first end face S1 and to be only partially arranged in the first section A1. In this case, part of the air-conditioning unit 9 protrudes from the end face S1 of the container 11. Fuses 7 and switches 8, which are each indicated by only a symbol for reasons of clarity, are also arranged in the first section. The first section A1 is separated from the second section A2 by a detachable partition wall 13 in a similar manner to how the first subregion A2.1 is separated from the second subregion A2.2. Shelf units 6 are arranged in a disassembled state in the first subregion A2.1 of the second section A2. An energy conversion unit 3 of the energy supply system 1 is located in the second subregion A2.2 of the second section A2. The energy conversion unit 3 has a DC/AC converter 4 and a transformer 5. During transport of the container 11, the energy conversion unit 3 and the disassembled shelf units 6 are fixed on the floor and/or side walls of the container 3 using suitable fixing elements (not illustrated in FIG. 1), thus avoiding damage to the energy conversion unit 3 and the container 11 during transport. The container 11 also has a fixing means or fixing structure (not illustrated in FIG. 1) in the second section A2 which are arranged on inner sides of its side walls in the longitudinal direction. After the container 11 has been transported, they are used to fasten the shelf units 6 in the interior of the container 11. Prelaid electrical lines 12 also run along the inner sides of the side walls of the container 11. They begin in the vicinity of the second end face S2, run along the second section A2 and extend into the first section A1. After the shelf units 6 have been fitted with the storage modules 15, the electrical lines 12 are used to electrically connect the storage modules 15 to one another and to connect the storage modules 15 to the control unit 10. After the container 11 has been transported to the operating location of the energy supply system 1, the energy conversion unit 3 is removed from the container 11 through the second end face S2. This is symbolized in FIG. 1 by an arrow illustrated on the second end face S2.

Figure 2:
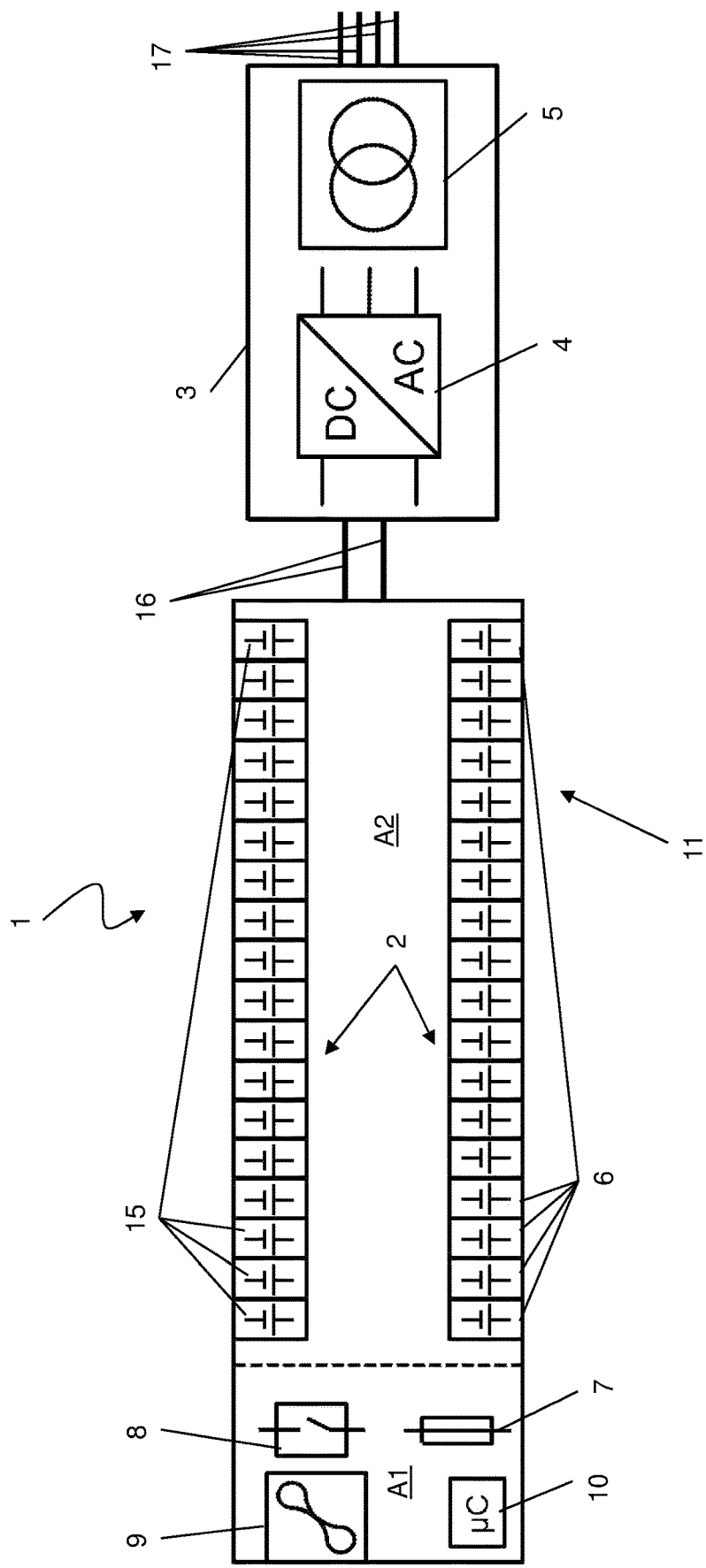
FIG. 2 shows an energy supply system according to the disclosure having the container according to the disclosure from FIG. 1 after transport and assembly at the operating location according to a further embodiment.

FIG. 2 illustrates an energy supply system 1 according to the disclosure having the container 11 according to the disclosure from FIG. 1 after transport and assembly at the operating location according to a further embodiment. The energy conversion unit 3 has been removed from the container 11 and has been arranged beside the latter on the end face. The partition wall 13 between the first subregion A2.1 and the second subregion A2.2 of the second section A2 has been removed from the container 11. Only a partition wall 13 separates the first section A1 from the second section A2. The remaining partition wall 13 may have a passageway which makes it possible for personnel to pass from the second section A2 into the first section A1 during operation of the energy supply system 1. The shelf units 6 are installed on the side walls of the second section A2 and are fitted with storage modules 15. In this case, the storage modules 15 are electrically connected to one another and to the control unit or circuit 10 via the prelaid electrical lines 12 which are not shown in FIG. 2 for reasons of clarity. The energy conversion unit 3 is connected to the storage modules 15 in the container 11 on a first side and is connected to an energy supply grid (not illustrated in FIG. 2) on a second side via connecting lines 16 or 17.

The invention claimed is:

1. An energy supply sub-system configured to operate in a transport configuration and an operating configuration within an associated energy supply system, the energy supply sub-system comprising:
   an air conditioning unit and/or a control circuit,
   an energy conversion unit, and
   a container comprising:
      a first structural section configured to accommodate the air-conditioning unit and/or the control circuit therein in the transport configuration and the operating configuration of the energy supply sub-system, and
      a second structural section configured to accommodate and fixedly secure the energy conversion unit therein in the transport configuration of the energy supply sub-system,
   wherein the second structural section is configured to release the energy conversion unit from its fixedly secure arrangement in the transport configuration to a moveable state to be selectively removed from the container for the operating configuration, and
   wherein the second structural section comprises a fixing structure for shelf units, such that, after the energy conversion unit has been removed from the second structural section of the container, the shelf units are installed on the fixing structure to establish the operating configuration and are configured to accommodate storage modules thereon for starting up the energy supply system.

2. The energy supply sub-system as claimed in claim 1, wherein the second structural section comprises a first subregion and a second subregion, and wherein the energy conversion unit is arranged in the second subregion during the transport configuration of the energy supply sub-system and components of the shelf units for the storage modules, are arranged in the first subregion during the transport configuration of the energy supply sub-system.

3. The energy supply sub-system as claimed in claim 2, wherein the first structural section adjoins a first end face of the container and the second subregion of the second structural section adjoins a second, opposite end face of the container.

4. The energy supply sub-system as claimed in claim 1, wherein the fixing structure is arranged along opposite side walls of the second structural section of the container.

5. The energy supply sub-system as claimed in claim 1, further comprising a fuse and/or a circuit breaker configured to operate the energy supply system with the control circuit in the operating configuration, wherein the fuse and/or the circuit breaker is/are arranged in the first structural section of the container.

6. The energy supply sub-system as claimed in claim 1, wherein the container comprises dimensions which comply with specifications for standard containers comprising one of a 20', 20' HC, 40', 40' HC, 45' HC, 45' PW or a 53' HC ISO sea freight container.

7. The energy supply sub-system as claimed in claim 1, wherein the second structural section comprises bearings for a guided removal of the energy conversion unit from the container.

8. The energy supply sub-system as claimed in claim 1, wherein the energy conversion unit is arranged in a manner selectively fixed in the second structural section of the container so that the energy conversion unit is fixed in the second structural section during the transport configuration and not fixed in the second structural section in the operating configuration.

9. The energy supply sub-system as claimed in claim 1, wherein an end face adjoining the second structural section or a roof side of the second structural section of the container comprises a hinged or detachable wall region, through which the energy conversion unit is removed from the container to establish the operating configuration.

10. The energy supply sub-system as claimed in claim 1, wherein, in the transport configuration of the energy supply sub-system, the second structural section of the container comprises prelaid electrical lines configured to connect the storage modules to one another, connect the storage modules to the control circuit, and/or connect the storage modules to the energy conversion unit.

11. An energy supply system configured to operate in a transport configuration and an operating configuration, comprising an energy conversion unit, shelf units, storage modules, a control circuit, an air-conditioning unit, and a container, the container comprising:
   a first structural section configured to accommodate the air-conditioning unit and/or the control circuit in the transport configuration of the energy supply system and the operating configuration of the energy supply system, and
   a second structural section configured to accommodate the energy conversion unit in the transport configuration of the energy supply system,
wherein the energy conversion unit is configured to be selectively removed from the container depending on the transport configuration or the operating configuration, and wherein the second structural section comprises a fixing structure for the shelf units, such that, after the energy conversion unit has been removed from the container, the shelf units are configured to be installed on the fixing structure and are fitted with the storage modules to establish the operating configuration.

12. A method for providing an energy supply system comprising a container with a first section and a second section, an energy store and an energy conversion unit, wherein the energy store comprises a multiplicity of storage modules that are arranged in a plurality of shelf units in the second section of the container during operation of the energy supply system, and wherein the energy conversion unit is arranged inside the second section of the container for the purpose of transport and is arranged outside the container for the purpose of operating the energy supply system, comprising:

removing the energy conversion unit from the second section of the container at an operating location of the energy supply system, arranging and installing the shelf units in the second section of the container, fitting the shelf units with the storage modules, and electrically connecting the storage modules to one another and to the energy conversion unit.

13. The method as claimed in claim 12, further comprising removing the energy conversion unit from the container at an end face or roof side of the second section of the container at the operating location.

14. The method as claimed in claim 12, further comprising removing the energy conversion unit from the container in a guided manner by means of a rail system and arranging the energy conversion unit on an operating platform beside the container.

15. The method as claimed in claim 12, wherein the storage modules comprise rechargeable batteries.

* * * * *